United States Patent
Erdler et al.

(10) Patent No.: US 8,369,644 B2
(45) Date of Patent: Feb. 5, 2013

(54) APPARATUS AND METHOD FOR REDUCING MOTION BLUR IN A VIDEO SIGNAL

(75) Inventors: Oliver Erdler, Ostfildern (DE);
Piergiorgio Sartor, Fellbach (DE);
Carsten Dolar, Recklinghausen (DE);
Martin Richter, Dortmund (DE)

(73) Assignee: Sony Corporation, Tokyo (JP)

( * ) Notice: Subject to any disclaimer, the term of this patent is extended or adjusted under 35 U.S.C. 154(b) by 999 days.

(21) Appl. No.: 12/403,657

(22) Filed: Mar. 13, 2009

(65) Prior Publication Data

US 2009/0245639 A1    Oct. 1, 2009

(30) Foreign Application Priority Data

Mar. 31, 2008    (EP) .................................... 08153783

(51) Int. Cl.
*G06K 9/40*    (2006.01)
(52) U.S. Cl. ........ 382/266; 382/260; 382/261; 382/262; 382/263; 382/264; 382/265
(58) Field of Classification Search ........... 382/260–266
See application file for complete search history.

(56) References Cited

U.S. PATENT DOCUMENTS

| | | | |
|---|---|---|---|
| 2003/0006991 A1* | 1/2003 | De Haan et al. ............. | 345/473 |
| 2005/0190164 A1* | 9/2005 | Velthoven et al. ........... | 345/204 |
| 2008/0043145 A1* | 2/2008 | Someya et al. .............. | 348/538 |
| 2009/0102966 A1* | 4/2009 | Jiang et al. .................. | 348/448 |

FOREIGN PATENT DOCUMENTS

| | | |
|---|---|---|
| EP | 0 249 644 A1 | 12/1987 |
| EP | 0 249 644 B1 | 12/1987 |
| JP | 03126070 A * | 5/1991 |
| WO | WO 03/100724 A2 | 12/2003 |
| WO | WO 03100724 A2 * | 12/2003 |

OTHER PUBLICATIONS 48.1: LCD motion Blur-Filtering, Klompenhouver et al., SID 04 Digest, 2004, pp. 1340-1343.*
Michiel A. Klompenhouwer, et al., "48.1: LCD Motion Blur Reduction with Motion Compensated Inverse Filtering", SID 04 Digest, 2004, pp. 1340-1343.
Hartmut Schröder, "Ein- und Mehrdimensionale Signalverarbeitung—Architekturen und Anwendungen für Bildsequenzen", B.G. Teubner, Band 2, 1998, pp. 306-307, 331-340 and 7 pages of English translation.

* cited by examiner

*Primary Examiner* — Jayesh A Patel
(74) *Attorney, Agent, or Firm* — Oblon, Spivak, McClelland, Maier & Neustadt, L.L.P.

(57) ABSTRACT

The present invention relates to an apparatus for reducing motion blur in a video signal, comprising an analysing means for determining edge characteristics of an input video signal and for providing motion estimation of an edge within said input video signal, generation means for generating a synthetic detail signal dependent on said edge characteristics and said motion estimation, and an adding means for adding the detail signal to the edge within the input video signal and outputting an output video signal.
The present invention further relates to a method for reducing motion blur in a video signal.

21 Claims, 9 Drawing Sheets

APPARATUS AND METHOD FOR REDUCING MOTION BLUR IN A VIDEO SIGNAL

The present invention relates to an apparatus and a method for reducing motion blur in a video signal. Modern displays, e.g. modern hold type displays, such as liquid crystal displays and other displays, due to the persistence of the image for the complete frame time, suffer from an artifact called "motion blur". Whenever the display renders the sequence of pictures, representing some motion, the observer perceives the moving objects, especially around the edges, blurred or unfocused.

Figure 1:
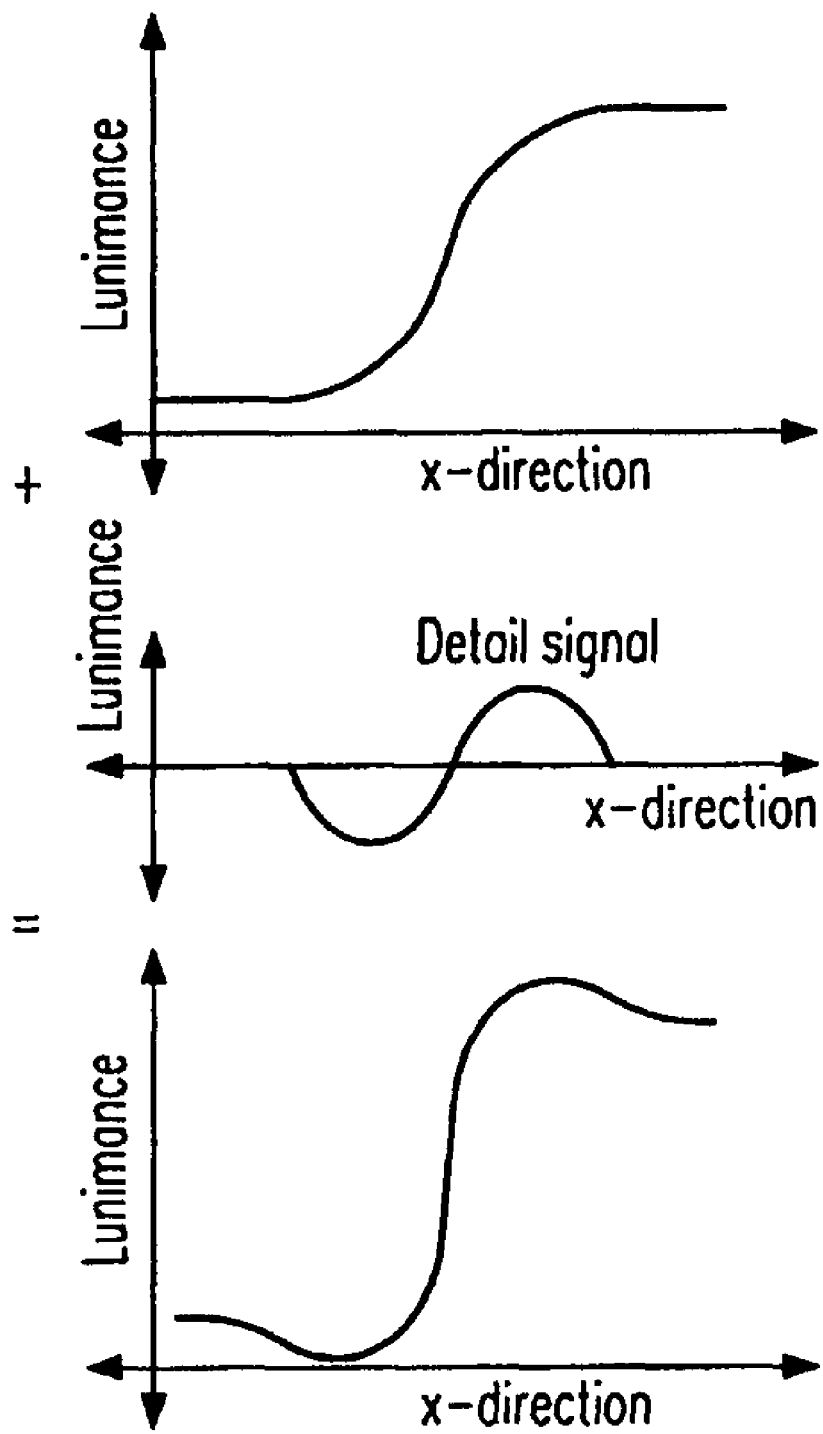

The principle of an existing non motion adaptive method for increasing the sharpness of all edges within a video signal in the same way is shown with reference to FIG. 1. This method known as luminance transient improvement is used for enhancing an edge. Generally, the diagrams representing edges or other signals within the video signal comprise an x-axis showing pixel positions and an y-axis showing the luminance value. Hereby, since luminance values at the pixel position are discrete values, normally an interpolation method is used to obtain a continuous curve.

In FIG. 1 three diagrams are shown, whereby on the y-axis the luminance of the signal is shown and on the x-axis exemplary pixel positions along the x-direction are shown. In the upper diagram the luminance signal of the original video signal is shown and to this original signal a synthetic detail signal, shown in the middle diagram, is added, so that a sum signal comprising the video signal and the detail signal shown in the bottom diagram is obtained. With this method the edge is made higher and sharper so that the resulting video image is perceived as more sharp. Hereby, such an addition is accomplished for every edge contained within the video signal.

The disadvantage is that this method sharpens all edges within the image in the same way independent of the movement velocity. When edges within a video signal are moving then due to the technical properties of the hold-type the edges will appear more flat, i.e. less sharp, with an increasing movement velocity. Therefore the need exists to correct the sharpness in a motion adaptive way. Generally two methods exist for reducing the motion blur.

One group is the display based methods which change display characteristics, for example by reducing the hold time thereby achieving a higher temporal resolution and thereby a reduction of the motion blur. Examples for such display based methods are scanning backlight, high frame rate driving or black frame insertion.

The disadvantage of these methods is a large area flickering, specifically when using scanning backlight or black frame insertion, or the necessity of using very fast displays, specifically when using high frame rate driving or black data insertion.

The second group of methods for reducing motion blur, which can be used in parallel or additional to the display based methods, are image based methods, which change the video signal itself by filtering or the like. These methods provide a pre-processing of the video signal to reduce motion blur. These methods are known as "motion compensated inverse filtering" (MCIF) and an example for MCIF is described in document US 2005/0190164 A1. MCIF aims to reduce motion blur by applying a frequency selective filter, e.g. a high pass or band-pass filter aligned in the direction of motion to boost the high frequency content in the frame before it is displayed. This method therefore uses the video image signal itself and raises a frequency part of the input video signal. With this method therefore the noise contained within the video signal is also raised and thereby enhanced. Further problems arise at very sharp edges, since with this method a very unnatural peaking is displayed which is perceived as disturbing by the watching user.

It is therefore the object of the present invention to overcome the disadvantages of the state of the art.

Specifically, the present invention has the object to present an apparatus and a method for reducing motion blur in a video signal, enabling the improvement of the video quality in an effective way and easy way.

The above object is achieved by an apparatus for reducing motion blur in a video signal according to claim 1.

The object is further achieved by a method for reducing motion blur in a video signal according to claim 26.

The present invention relates to an apparatus for reducing motion blur in a video signal, comprising an analysing means for determining edge characteristics of an input video signal and for providing motion estimation of an edge within said input video signal, generation means for generating a synthetic detail signal dependent on said edge characteristics and said motion estimation, and an adding means for adding the detail signal to the edge within the input video signal and outputting an output video signal.

The present invention further relates to a method for reducing motion blur in a video signal, comprising the steps of determining edge characteristics of an input video signal and for providing motion estimation of an edge within said input video signal, generating a synthetic detail signal dependent on said edge characteristics and said motion estimation, and adding the detail signal to the edge within the input video signal and outputting an output video signal.

In a further aspect the present invention relates to a system providing an overall improvement of video signal quality.

Advantageous features are defined in the respective dependent claims.

Figure 2:
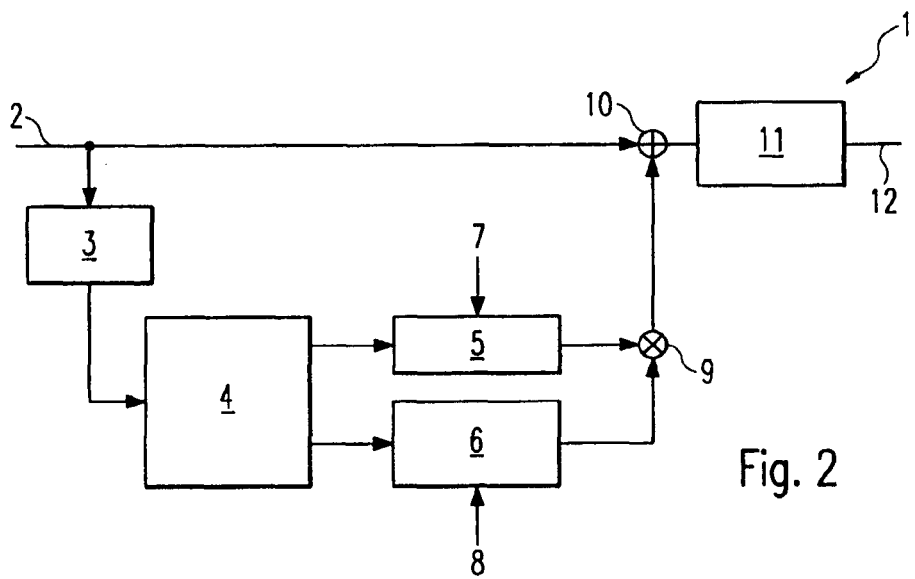
Figure 3:
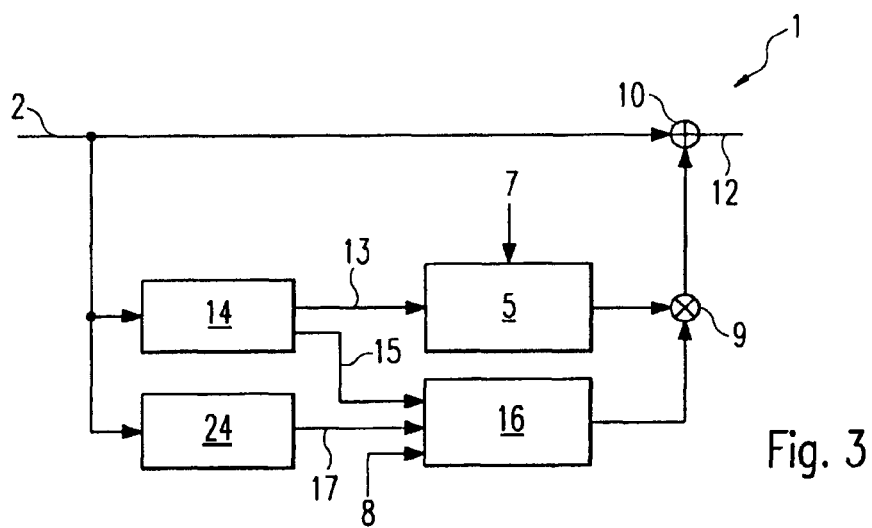
Figure 4:
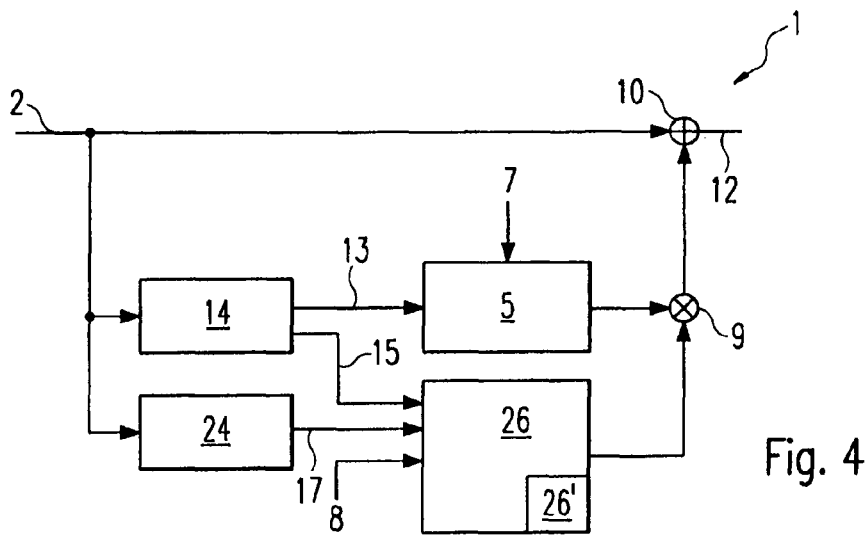
Figure 5:
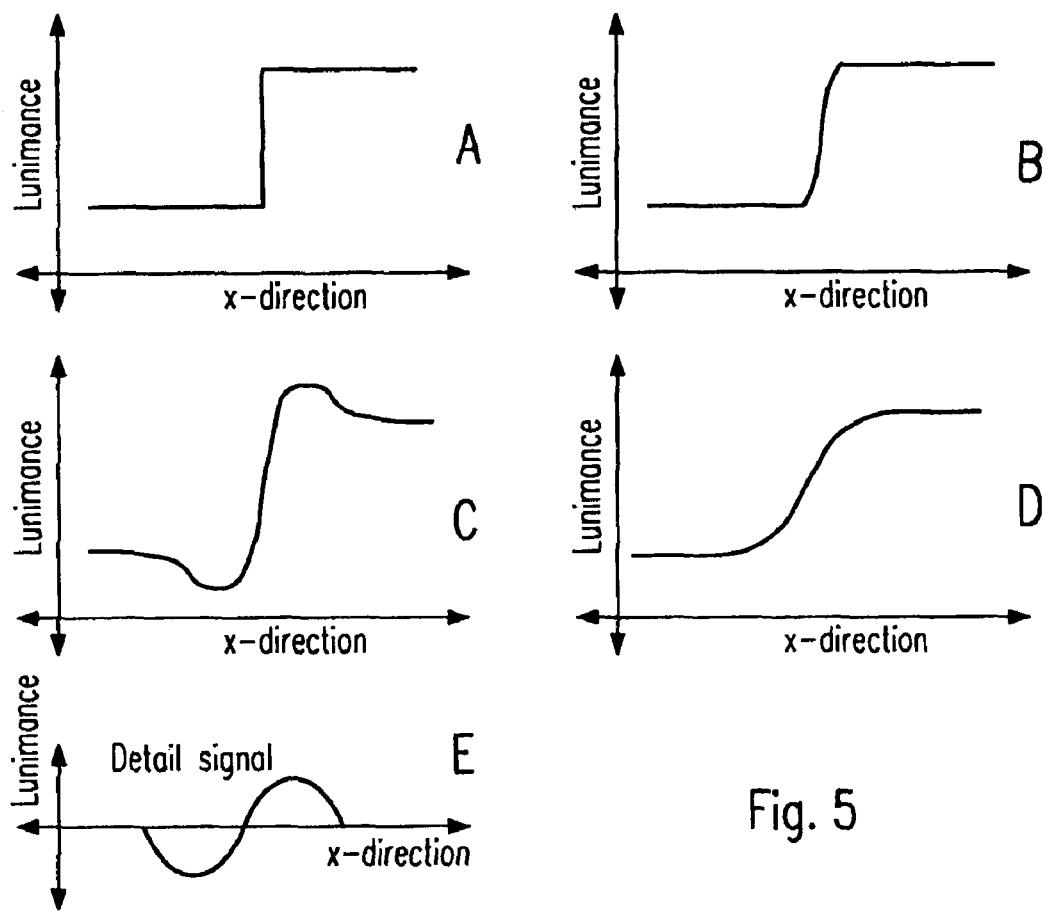
Figure 6:
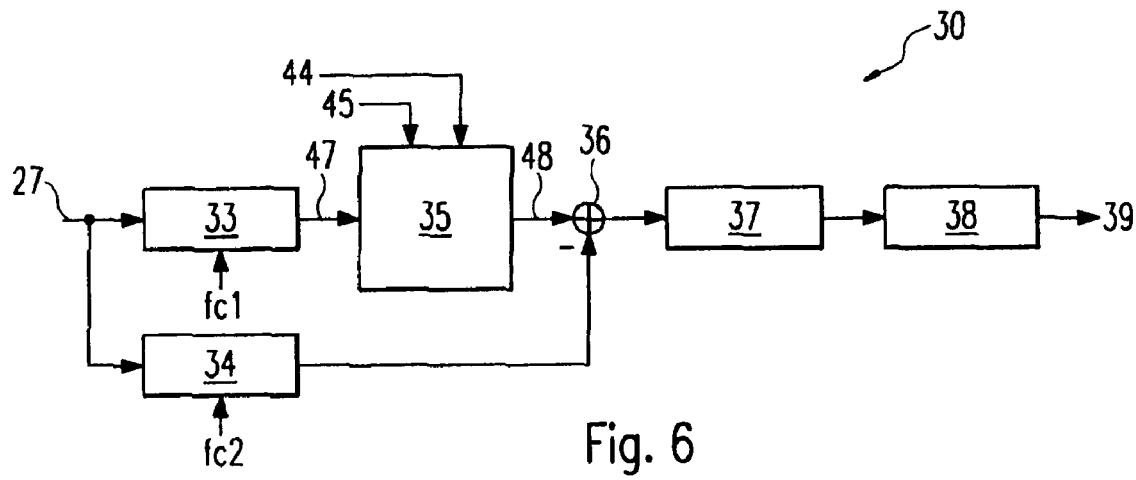
Figure 7:
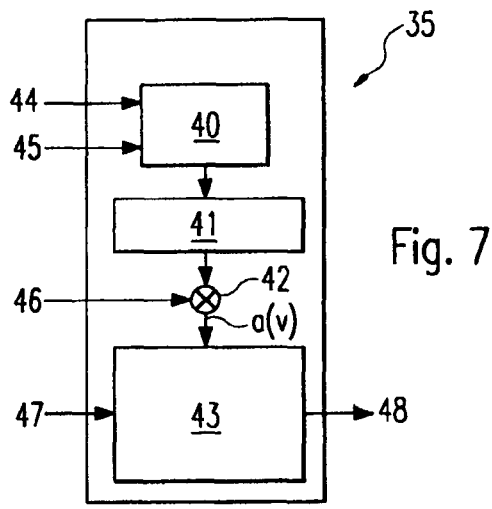
Figure 8:
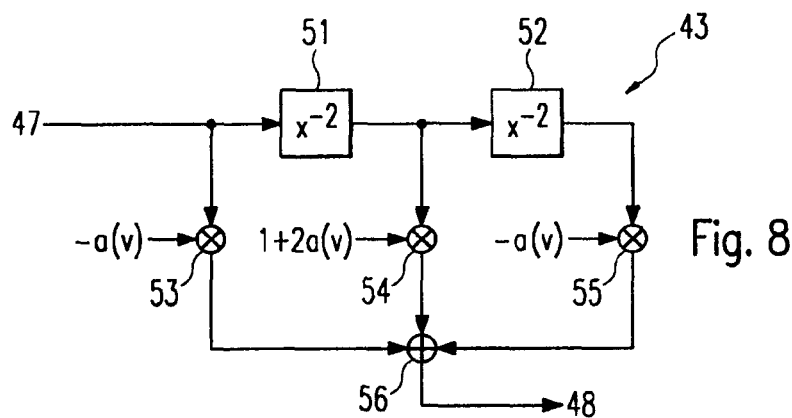
Figure 9:
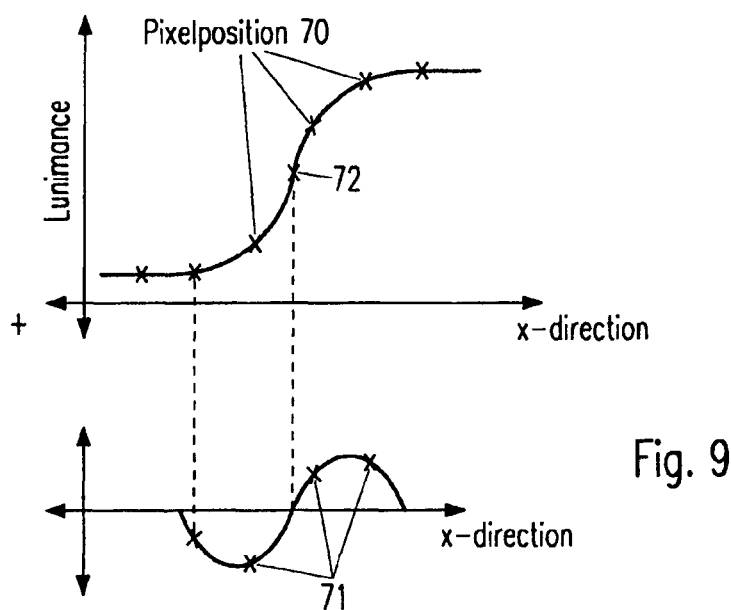
Figure 10:
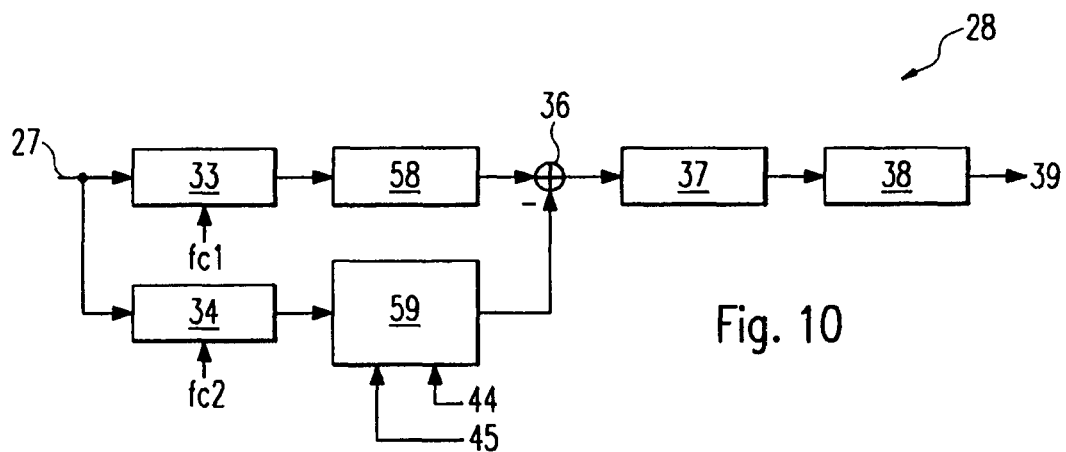
Figure 11:
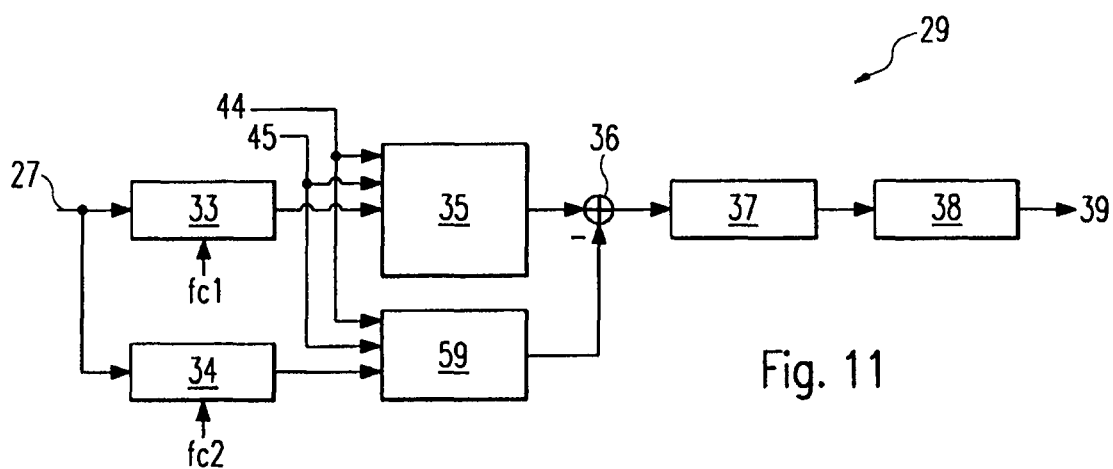
Figure 12:
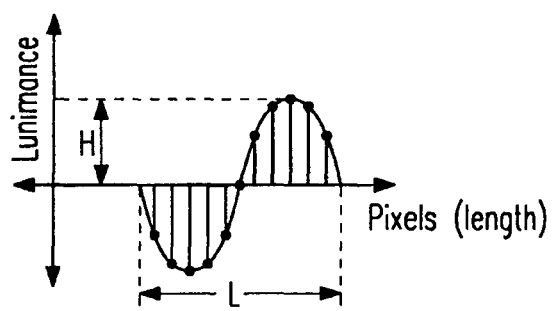
Figure 13:
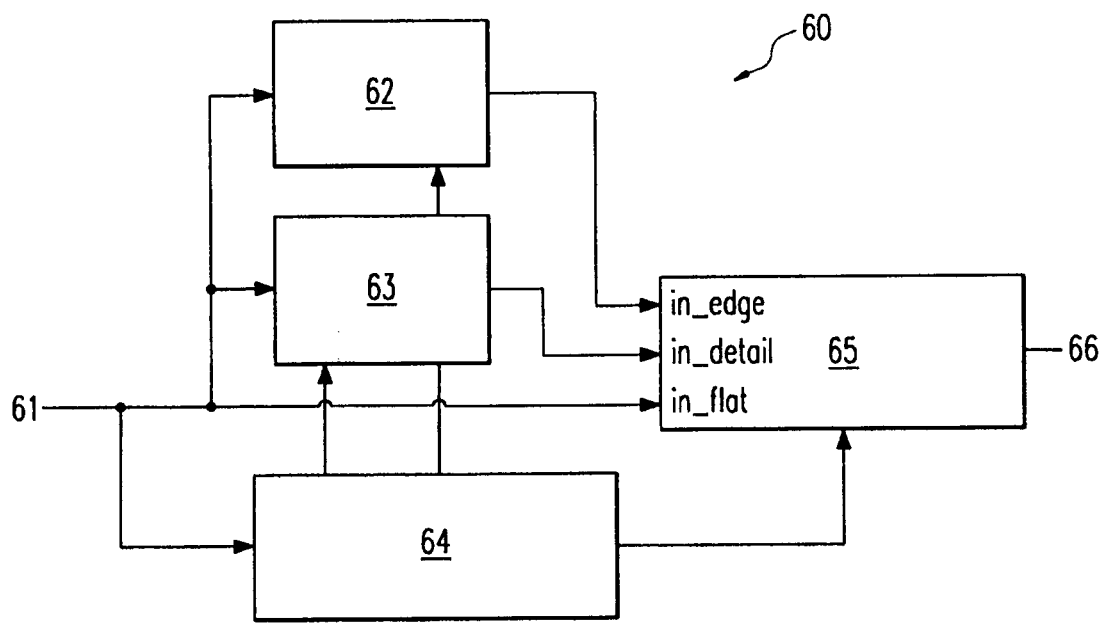
Figure 14:
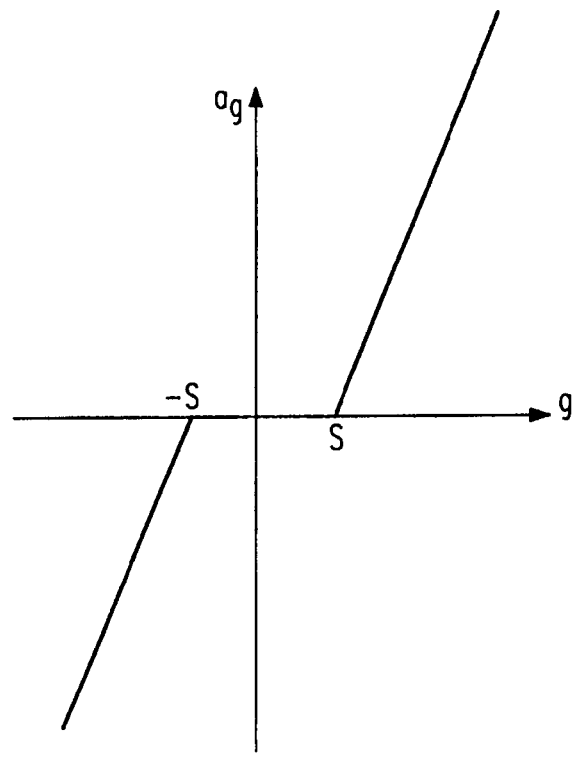
Figure 15:
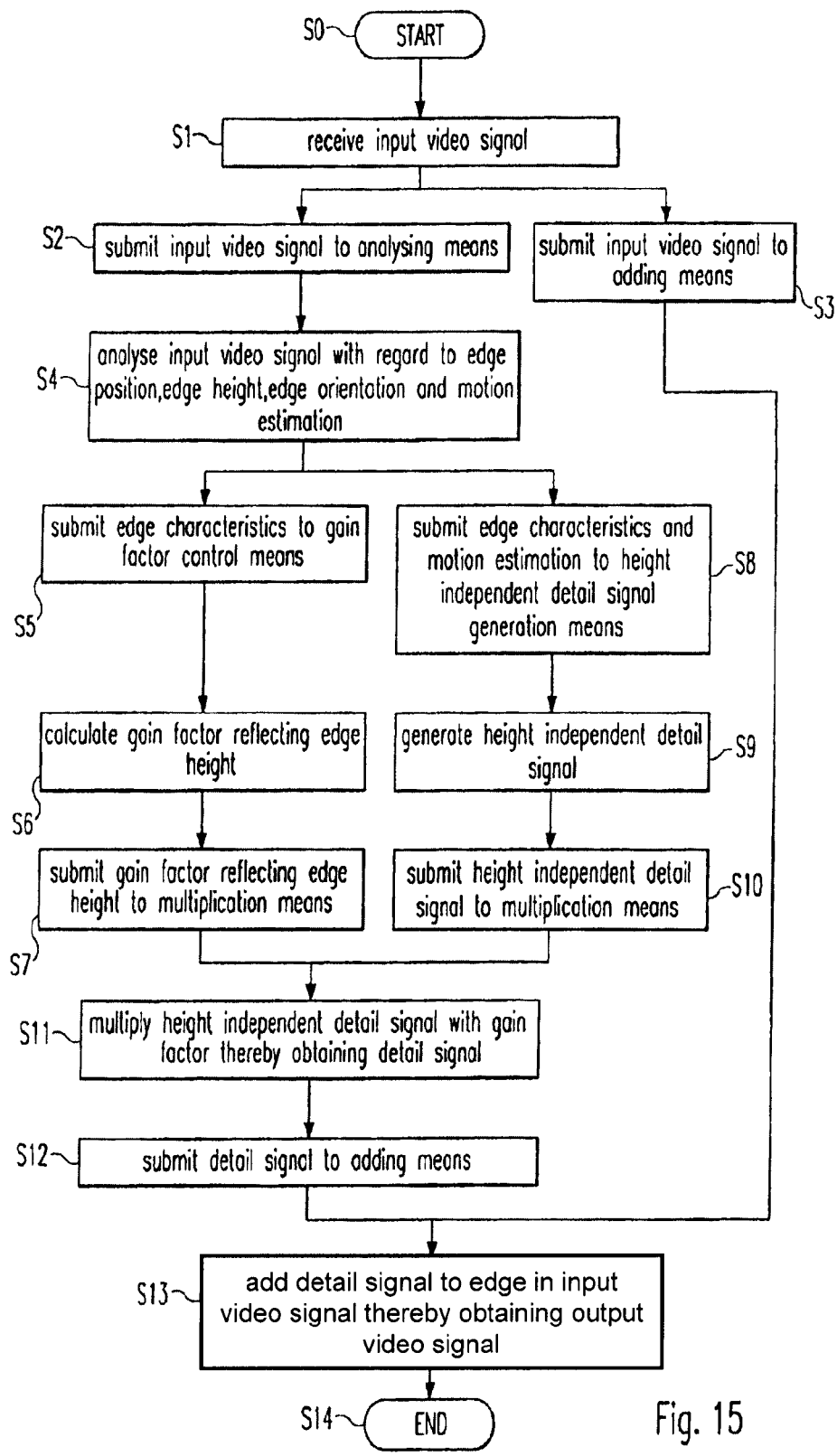
Figure 16:
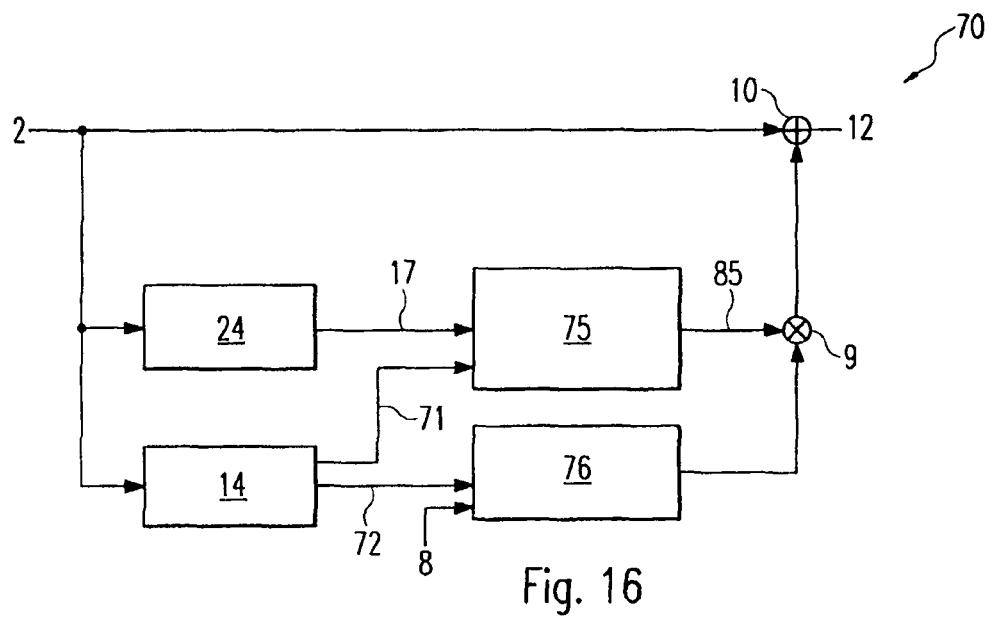
Figure 17:
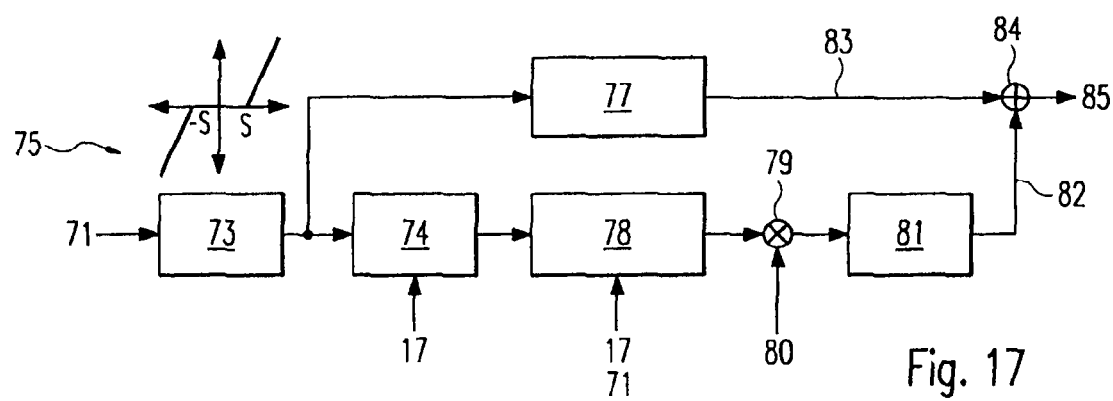
Figure 18:
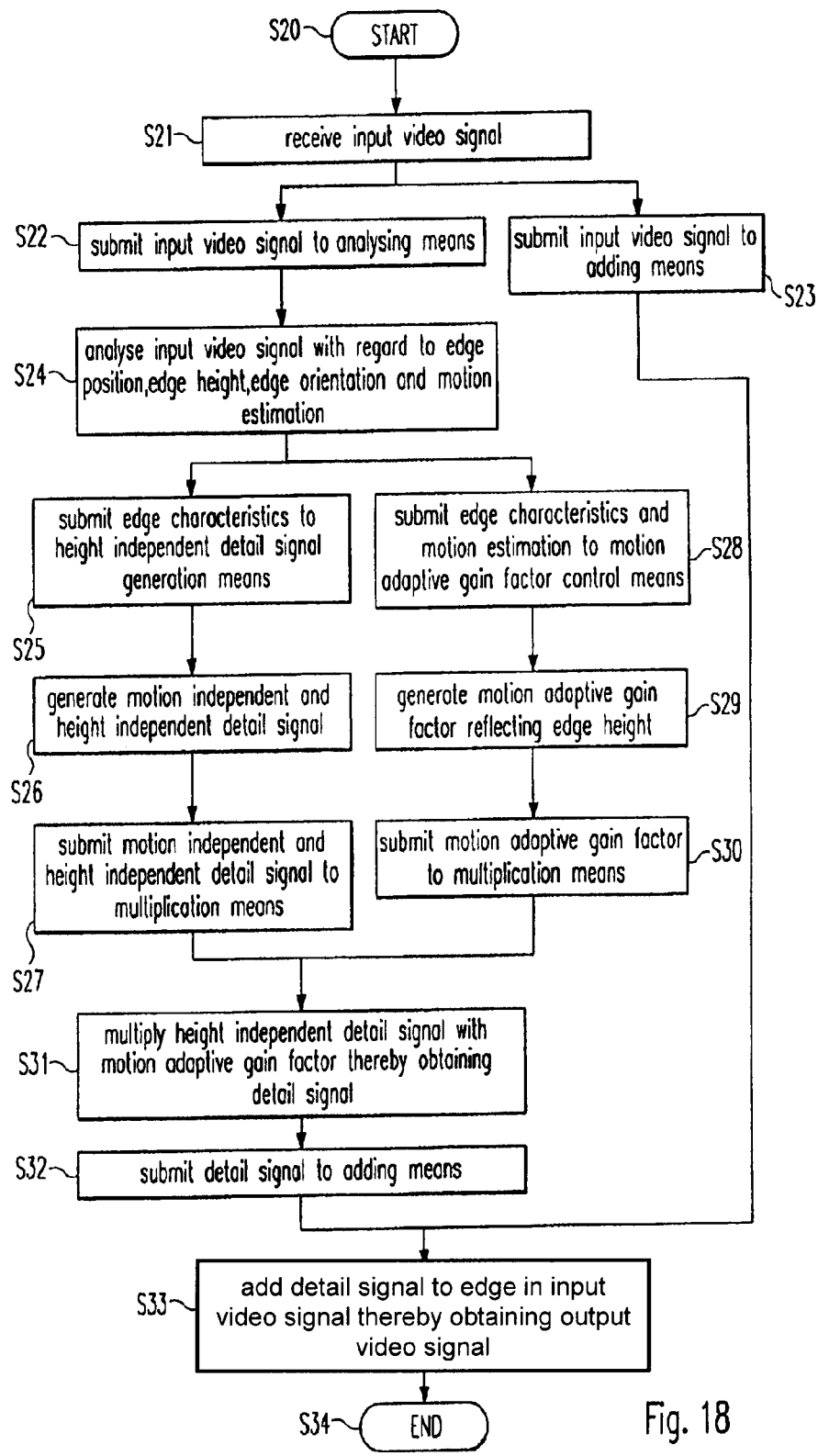

The present invention will now be explained in more detail in the following description of preferred embodiments in relation to the enclosed drawings in which FIG. 1 shows a diagram explaining a method according to the state of art, FIG. 2 shows the apparatus for reducing motion blur according to a first aspect of the present invention, FIG. 3 is a first embodiment of an apparatus for reducing motion blur according to the first aspect of the present invention, FIG. 4 is a second embodiment of an apparatus for reducing motion blur according to the first aspect of the present invention, FIG. 5 shows a plurality of diagrams explaining the generation of a detail signal according to the first aspect of the present invention, FIG. 6 is a first embodiment for an apparatus for generating a height independent detail signal according to the first aspect of the present invention, FIG. 7 shows a component of the apparatus shown in FIG. 6, FIG. 8 is a logical network explaining a detail of the apparatus shown in FIG. 7, FIG. 9 shows diagrams explaining the positioning and addition of the detail signal according to the present invention, FIG. 10 is a second embodiment of an apparatus for generating a height independent detail signal according to the first aspect of the present invention, FIG. 11 is a third embodiment of an apparatus for generating a height independent detail signal according to the first aspect of the present invention, FIG. 12 is a diagram for explaining a further possibility of correcting motion blur, FIG. 13 is an apparatus for providing an overall motion blur reduction dependent on the content of the video signal, FIG. 14 is a diagram showing the Coring curve, FIG. 15 is a flow chart showing the method steps according to the first aspect of the present invention, FIG. 16 shows the apparatus for reducing motion blur according to a second aspect of the present invention, FIG. 17 shows a detail of the apparatus of FIG. 16, and FIG. 18 is a flow chart showing the method steps according to the second aspect of the present invention.

In the following, an apparatus according to a first aspect of the present invention will be explained.

FIG. 2 shows a schematic block diagram of an apparatus for reducing motion blur in a video signal according to the present invention. The apparatus 1 and the corresponding method carried out by the apparatus hereby bases on the generation of a synthetic detail signal, i.e. for the correction of the motion blur not the original video signal itself is used but a detail signal is synthetically, i.e. artificially generated and added to the original video signal. This has the advantage that the noise or other disturbances contained within the original video signal is not comprised in the detail signal thereby providing an improved motion blur reduction.

With reference to FIG. 1 now the components of the apparatus according to the present invention and their functionalities will be explained. The incoming video signal, which in the following is referred to as input video signal 2 is fed to the apparatus 1 and then submitted to several components for reducing motion blur.

Optionally, a pre-processing mean 3 can be provided for pre-processing the input video signal 2. For example a noise reduction or an interpolation can be accomplished. In the case of an interpolation then the pre-processing means 3 accomplishes a magnification of the image. Motivation herefore is that the image later on is displayed with a higher resolution on the display and that the position of the edge, specifically the centre of the edge has to be determined correctly and with an accuracy higher than the pixel position in order to properly generate and add the detail signal.

The pre-processed input video, or in case that no pre-processing means 3 is provided the original input video signal 2 is then submitted to an analysing means 4. The analysing means 4 is adapted to determine edge characteristics within the video signal and to provide a motion estimation of the edges within the video signal. Additionally, further analysing steps can be accomplished, for example the detection of disturbances. Hereby, in the present invention the term "motion estimation" is intended to refer to motion vector information.

The edge characteristics according to the present invention comprise the position, the height and the orientation of the edge. Each pixel has a position defined by two parameters x and y. For each edge within the input video signal the position, i.e. the pixel positions x and y of the pixels of the edge are determined. The height of the edge can be derived from the luminance values and is advantageously calculated by using the gradient of the pixel luminance values. The orientation of the edge within the image is important, since separate detail signals for the x-direction as well as for the y-direction are generated. The motion estimation comprises information on the movement direction and the movement velocity of the edge within the video signal. The movement direction is important, since only those parts of the edge being orthogonal to the movement direction create blurring and have to be corrected.

In the following it will be explained in detail, how the analysing means 4 detects the position, the height and the orientation of an edge within the video signal.

For each pixel within the input video signal 2 the analysing means 4 accomplishes an edge detection, i.e. the analysing means 4 determines whether the actual pixel is an edge or part of an edge. In case that an edge is detected, a flag is set for the respective pixel and submitted to further processing means within the apparatus 1.

One possibility of accomplishing the edge detection is the combined gradient Laplace operator, which will be explained in the following. A pixel is determined to be an edge pixel in case that the absolute value of the gradient lies above a specific threshold value T and in case the Laplace operator provides a zero crossing, i.e. only when both conditions are met then a pixel is determined to be an edge pixel. In addition to the detection of an edge the specific sub pixel position of the centre of the edge dependent on the Laplace operator as well as the height of the edge dependent on the value of the gradient is determined. The sub pixel positions and specifically the centre of the edge with an accuracy better than the pixel accuracy, i.e. with a very high accuracy has to be determined, since otherwise the human eye notices a false positioning of the detail signal with respect to the edge.

The determination of the sub pixel position is accomplished by calculating the zero crossing of the second derivation by using the Laplace operator. The edge height is determined by using the gradient operator within the first derivation according to the following equations:

$$g_x = I(x-1, y) - I(x, y)$$
$$g_y = I(x, y-1) - I(x, y)$$
$$\vec{g} = \begin{pmatrix} g_x \\ g_y \end{pmatrix}$$

I hereby is the luminance value, i.e. the grey value of the video signal and x and y are the actual pixel positions. The vector $\vec{g}$ is referred to as gradient.

The advantage of the gradient Laplace operator is its accuracy with regard to edge detection and its robustness regarding affections by noise. But also other methods for detecting an edge and determining the edge characteristics can be used. In preferred embodiments methods using a gradient of the pixel values, i.e. of the luminance values, is used but also other methods basing on other mathematical functions and operations, e.g. the Sobel operator, the Roberts-gradient, are possible and the present invention is not limited to above mentioned method.

Additionally, the analysing means 4 detects the orientation of the edge based on the pixel values of adjacent pixels.

The edge characteristics are then submitted to a gain factor control means 5 as well as to a height independent detail signal generation means 6. Additionally, motion estimation comprising motion vectors indicating the direction and velocity of the movement of the edge within the video signal are submitted from the analysing means 4 to the height independent detail signal generation means 6. Since the height independent detail signal generation means 6 does not need information on the height of the edge, the transmission of the height from the analysing means 4 to the height independent detail signal generation means 6 can be omitted.

Generally, the height independent detail signal generation means 6 generates height independent detail signals only dependent on the position, orientation and the motion estimation of the edges. The height independent detail signal generation means 6 thereby generates height independent detail signals based on a normalized height of the edges. The term "height independent" according to the present invention thereby reflects that the respective values are normalised or calculated based on normalised values. The functionalities of the height independent detail signal generation means 6 will be explained in detail later on.

As already explained, after determining the edge characteristics and providing motion estimation, the analysing means 4 transmits these information to the gain factor control means 5. The height of the edges is then determined by the gain factor control means 5, which further calculates a gain factor, which is later on used to multiply the height independent detail signal with the gain factor in order to obtain the detail signal to be added to the input video signal, whereby said detail signal due to the multiplication also depends on the height of the edge.

The determination of the gain factor $a_g$ by the gain factor control means 5 in the following will be explained in detail with reference to FIG. 14. The gain factor $a_g$ is determined by using the Coring curve shown in FIG. 14. Hereby a diagram is shown with the height of the edge on the x-axis and the gain factor $a_g$ on the y-axis.

The gain factor $a_g$ is determined dependent on the input value, i.e. dependent on the gradient. By applying the Coring curve to the gradient, a small edge height results in a gain factor $a_g=0$ for avoiding disturbances resulting from noise, specifically from small amplitudes. As will be explained later, the detail signal generation and addition is accomplished separately in the x- and the y-direction. Depending on the gradient $(g_x, g_y)$ there have to be determined two gain factors $a_{gx}=f(g_x)$ and $a_{gy}=f(g_y)$ in x- and y-direction, whereby $f(g)$ mathematically describes the Coring curve.

In the present invention the term "height independent detail signal" refers to a detail signal based on a normalised edge height and thereby being height independent. These height independent detail signals are generated by the height independent detail signal generation means 6. The term "detail signal" or "synthetic detail signal" refers to signals, which have already been multiplied with the gain factor calculated by the gain factor control means 5. I.e. the detail signals, which are also referred to as synthetic detail signals, according to the present invention are the product of the gain factor $a_g$ and the height independent detail signal.

As already mentioned the detail signals and accordingly also the height independent detail signals are generated separately for enhancing the edge in the x- and the y-direction, that means that for each edge two detail signals are generated, whereby one detail signal is added in the x-direction to the video signal and the other detail signal is added in the y-direction to the video signal.

The generated detail signals hereby comprise a specific length. The term "length" refers to the fact, that a detail signal is generated which is added to several pixels, i.e. which has a length of several pixels. In the present invention advantageously a length of five pixels is used for the detail signal, but the present invention can also be applied to shorter or greater length of detail signals.

In case that the actual analysed pixel is determined as being an edge pixel, then dependent on the edge characteristics and motion estimation a detail signal in x- as well as in y-direction is added to the input video signal 2. Since the detail signal has generally a length of more than one pixel, not only the actually analysed pixel itself is changed, but also the direct neighbouring pixels are changed. E.g. in case of a detail signal having a length of five pixels then also the two adjacent pixels on the left, the right, the top and the bottom side are changed. How much these pixels are changed, depends on the edge height and the orientation of the edge at the position of the actual analysed pixel.

The height independent detail signal generation means 6 generates the height independent detail signals. As will be later explained, the height independent detail signals can either be generated by looking previously generated height independent detail signals up in a look up table or by directly calculating a height independent detail signal based on the information submitted by the analysing means 4.

The term "generating" in the present invention therefore can refer to different ways of providing the height independent detail signal, i.e. it refers to looking height independent detail signals up in a look up table or to calculating height independent detail signals by a calculation logic comprised within the height independent detail signal generation means.

That means that the height independent detail signal generation means 6 can generate the detail signals either online or offline. The online generation means that the detail signal generation means calculates the height independent detail signals depending on the information submitted by the analyzing means. In case of an offline generation, the height independent detail signals have been externally generated and stored in a look up table comprised in the detail signal generation means. The height independent detail signals are hereby stored for different edge orientations and velocities but have not to be stored also for different edge heights, since the height is accounted for by the gain factor control means 5.

The height independent detail signal generation means 6 as previously explained in case that the flag is set to one, i.e. in case that a pixel is determined to be an edge pixel, generates two height independent detail signals, i.e. one for the x- and one for the y-direction. The height independent detail signals are generated based on the exact centre of the edge which is determined with a sub pixel accuracy and additionally the height independent detail signals are generated based on a normalized edge.

Additional parameters 7, can be fed to the gain factor control means 5, such as external parameters for example display properties or the like. Likewise, additional parameters 8, can be fed to the synthetic detail signal generation means such as parameters for a global (static) sharpness enhancement. Thereby the present invention allows to enhance the image sharpness so that motion blur can be reduced as well as a sharpening of the edge can be accomplished.

The height independent detail signal generation means 6 outputs the generated height independent detail signal to a multiplication means 9 and the gain factor control means 5 outputs the gain factors for each direction, i.e. the gain factor $a_{gx}$ and $a_{gy}$ also to the multiplication means 9, where then the height independent detail signal is multiplied with the respective gain factor in order to correctly reflect the edge height, whereby with this multiplication the detail signal is obtained and output by the multiplication means 9.

The detail signal is further submitted to an adding means 10, and the original input video signal 2 is also submitted to the adding means 10, which then adds the detail signal to the input video signal 2 and outputs the sum of the input video signal 2 and the detail signal, thereby outputting a video signal with reduced motion blur. This video signal is further submitted to a post-processing means 11.

The post-processing means 11 can for example be provided for clipping the submitted video signal, i.e. to limit the video signal to the value interval of the display. The post-processing means 11 then outputs the output video signal 12 which can then be displayed on the display.

It is again to be noted that the present invention does not use the input video signal 2 itself for the calculation of the detail signal, e.g. by enhancing or filtering the input video signal 2, but rather generates synthetic detail signals which are not generated from the video signal information itself but only based on an analysis of edge characteristics and motion estimation of the input video signal 2. This results in the advantage that the noise contained within the input video signal is not enhanced with the detail signal generation. Further, since several parameters can be used for generating the detail signal a very sharp image without any disturbances can be produced.

Specifically, further information can be used for generating the synthetic detail signal, such as information on the texture, on the image noise or other interferences. Such problems should also be removed, since any interference in the image, for example coding artifacts, e.g. "blocking" should not be enhanced.

Further information can be used either in the height independent detail signal generation means 6 or in the gain factor control means 5 or in both components. A general enhancement of the image sharpness can for example be accomplished either automatically or upon specific settings selected by the user. Specifically in cases where an interpolation was accomplished in order to enlarge the image for fitting it to the resolution of the display, the sharpness has to be corrected. The sharpness can either be corrected by increasing the gain factor $a_g$, i.e. the larger the gain factor becomes the sharper the image will, or by using parameters when generating the height independent detail signal as will be explained in detail later on. Display parameters, such as reaction times of the display or overdrive values can be used to influence the detail signal generation.

The main process steps of the method for reducing motion blur according to the first aspect in the following will be explained with reference to FIG. 15. The process starts in step S0 and in the next step S1 the input video signal 2 is received by the apparatus 1 for reducing motion blur according to the present invention. The input video signal 2 is then in step S2 submitted to the analysing means 4 and at the same time the input video signal 2 in step S3 is submitted to the adding means 10. In case that a pre-processing means 3 is provided, then the input video signal 2 instead of being directly submitted to the analysing means 4 first passes the pre-processing means 3 and is then submitted to the analysing means 4.

The analysing means 4 analyses the input video signal 2 for determining edge characteristics within the input video signal 2 and for providing motion estimation of an edge within said input video signal 2. Specifically, the analysing means 4 determines the edge characteristics by determining the position, the height and the orientation of an edge within the video signal. For providing a motion estimation the analysing means 4 provides motion vectors indicating the direction and velocity of the movement of the edge.

The analysing means 4 then submits the edge characteristics in step S5 to a gain factor control means 5. In step S6 the gain factor control means calculates a gain factor reflecting the height of the edge. The gain factor control means 5 in the next step S7 submits this gain factor to a multiplication means.

The analysing means 4 further submits the edge characteristics and the motion estimation in step S8 to the height independent detail signal generation means 6 which in the next step S9 generates a height independent detail signal based on the received information. This height independent detail signal is independent of the height of the edge and refers to a normalised edge height. In the next step S10 the height independent detail signal generation means 6 submits the height independent detail signal also to the multiplication means 9.

In the next step S11 the multiplication means 9 multiplies the received height independent detail signal with the received gain factor thereby obtaining the detail signal which in the present application is sometimes also referred to as final detail signal or synthetic detail signal. In the next step S12 the multiplication means 9 submits the detail signal to the adding means 10, to which already in step S3 the input video signal 2 has been submitted.

Generally, in the present application the gain factor control means 5, the height independent detail signal generation means 6 and the multiplication means 9 in combination are referred to as generating means for generating the detail signal.

In the next step S13 the adding means then adds the received detail signal to the received input video signal 2 thereby obtaining the output video signal. This output video signal then has properties to appear with less motion blur when displayed on the display. Afterwards (not shown in FIG. 15) a post-processing step can be provided.

The process ends in step S14.

In FIG. 3 a first embodiment of an apparatus 1 for reducing motion blur in a video signal according to the present invention is described. In this embodiment the analysing means is separated into an edge detection means 14 and into an motion estimation means 24. Further, the height independent detail signal generation is accomplished online, i.e. during the operating time of the method.

The edge detection means 14 is adapted to determine, whether the actual analysed pixel is an edge pixel. Is this the case then a detail signal has to be generated and added. In case that no edge is detected, the input video signal 2 is not influenced. Additionally, the edge detection means 14 determines the egde height and orientation. The edge detection hereby can be advantageously accomplished by using the combined gradient Laplace operator as previously described and the determination of the position of the centre of the edge has also been previously described. To summarize, the edge detection means 14 is adapted to determine the edge characteristics.

The motion estimation means 24 advantageously uses a predictive block matching method but can also use any other method for enabling a motion estimation, i.e. a phase plane correlation or an optic flow.

The edge detection means 14 and the motion estimation means 24 can be implemented as separate blocks or can both be implemented in the analysing means 4.

The edge detection means 14 submits the edge height 13 to the gain factor control means 5 and further submits a signal 15 to the height independent detail signal generation means 16 comprising a flag indicating an edge, the gradient and the position of the edge calculated by the Laplace operator. The motion estimation means 24 submits motion vectors 17 to the height independent detail signal generation means 16. Additional static sharpness enhancement parameters 8 can further be provided to the height independent detail signal generation means 16.

The gain factor control means 5 has been previously explained and has the same functionalities.

The height independent detail signal generation means 16 corresponds mainly to the detail signal generation means 6 but now is implemented as an online generation means. That means that the height independent detail signal is generated during the running time of the method. The advantage of this first embodiment is that no look up table is necessary, that means no memory space has to be used for the look up table. Further, additional parameters during the runtime can be easily adapted.

FIG. 4 shows a second embodiment of an apparatus 1 for reducing motion blur in a video signal.

In the second embodiment the height independent detail signal generation means 26 comprises a look up table 26' where the height independent detail signals are stored. These height independent detail signals have been calculated by an external calculation device and stored within the look up table. These steps can for example already have been accomplished by the vendor of the display device. The selection of the necessary height independent detail signals is accomplished by using the parameters of the motion vectors, the edge position, the edge orientation and a sharpness parameter 8.

The sharpness parameter 8 is optional and is only used in case that static sharpness enhancement in addition to the reduction of the blurring is provided.

The remaining components are identical to those components as previously described.

In the following now the generation of the height independent detail signal is described in detail. Hereby, the following described components or method steps can be either implemented for use in the online detail signal generation or in the offline detail signal generation. I.e. the following possibilities can either be implemented directly in the height independent detail signal generation means or can be accomplished by an external height independent detail signal generation means, which is adapted to calculate the height independent detail signals for different combinations of edge positions, orientations and motion vectors and to store the generated height independent detail signals within a look up table implemented in the detail signal generation means 26.

FIG. 6 shows a first embodiment of a generation apparatus 30 for generating a height independent detail signal. For a better understanding in FIG. 5 several diagrams showing different signals which are generated by the different components of the generation apparatus 30 are shown. It is to be noted, that in case the generation apparatus 30 is implemented in height independent detail signal generation means 6, 16 the generation apparatus 30 may be identical to the height independent detail signal generation means 6, 16 or may be a part of the height independent detail signal generation means 6, 16.

Until a video signal is shown on a display, it is damped or influenced by several factors. Specifically, it is less sharp which may for example happen dependent on the transmission channel characteristics, e.g. when using an analogue video signal, or in case that the input signal is scaled or increased by is size. By adding a detail signal the original sharpness is supposed to be reinstated. Therefore, in order to properly calculate a detail signal, it has to be detected how much the video signal was damped. The principle underlying the detail signal generation will be explained with reference to the diagrams shown in FIG. 5. Hereby in each diagram the luminance on the y-axis dependent on the pixel position on the x-axis is shown.

An ideal jump 27 shown in diagram A of FIG. 5 is fed to the generation apparatus 30. The apparatus 30 comprises first modelling means 33, 35 for modelling transmission characteristics of an ideal transmission channel for providing a modelled ideal signal. In this first channel, i.e. in an ideal channel model the signal is modelled according to the ideal transmission characteristics, that means that the signal is modelled in a way to reflect the signal how it is supposed to look like in an ideal case. The first modelling means comprises a first low pass filter 33 and an enhancement means 35, the functionalities thereof will be explained in the following.

An example for an ideal signal is shown in diagram B of FIG. 5. Hereby the ideal edge in an image is modelled. The modelling is accomplished by using the first low pass filter 33 whereby the cut-off frequency fc1 of this first low pass filter 33 is constant and lies in the range of the Nyquist frequency. Advantageously for the first low pass filter 33 an FIR-filter is used, which has been designed by using a kaiser window since this has best properties in relation to the filter flank and corresponding peakings. But any other low pass filter or filter implementation is possible. The reason for using a low pass filter in the ideal channel is that the ideal edge is shown in diagram A is not present in natural images and in any case the edge has a certain width. By using the low pass filter 33 the ideal jump is changed into a signal having ideal edge characteristics.

The first low pass filter 33 then submits the signal 47 to a motion and edge adaptive enhancement means 35. The motion and edge adaptive enhancement means 35 further sharpens the signal so that a more sharp edge or sharp slope is created and outputs the signal 48. Thereby the peaking of the edge can be enhanced up to a specific percentage of the edge height, depending on the ideal value for a sharp image. The further overshoots which may disturb the impression of quality are not affected by this sharpening. The enhanced signal is shown in diagram C of FIG. 5. The gradient 45 and the motion vectors 44 are fed to the motion and edge adaptive enhancement means 35, so that the motion and edge adaptive enhancement means 35 according to the present invention is motion adaptive. The motion and edge adaptive enhancement means 35 will be described in detail later on.

The generating apparatus 30 further comprises second modelling means 34 for modelling the transmission characteristics of a real channel, i.e. with the second modelling means 34 the signal is changed like in reality when for example being transmitted via an analogue channel. The ideal jump 27 as shown in diagram A of FIG. 5 is therefore also fed to the second modelling means, which in this embodiment comprises a second low pass filter 34. The cut-off frequency fc2 of this filter is variable and can be changed dependent on how much the signal was damped which in turn depends on the transmission channel. The more the signal is damped the smaller the cut-off frequency fc2 of the second low pass filter 34 has to be chosen. The implementation of this second low pass filter 34 is advantageously accomplished by using a Hamming window. But also any other possible low pass filter can be used.

The signal as modelled by the second modelling means in the real channel model is shown in diagram D of FIG. 5.

As previously described cut-off frequencies fc1 and fc2 are submitted to the first low pass filter 33 and the second low pass filter 34. Hereby, in both cases changing or fixed values for the frequencies fc1 and fc2 can be chosen. The parameters for both low pass filters 33, 34 can also be contained in look up tables being dependent on the transmission characteristics and the cut-off frequencies fc1 and fc2. In case that no additional sharpening is desired equal values have to be chosen for fc1 and fc2.

The signal from the first modelling means 33, 35 of the ideal channel and the signal from the second modelling means 34 of the real channel are fed to a subtracting means 36. In the subtracting means 36 the signal of the real channel is subtracted from the signal of the ideal channel i.e. the difference is determined between target transmission and actual transmission. This difference signal is shown in diagram E of FIG. 5. This difference signal can be interpreted as the part of the signal which is lost due to the damping of the real channel. As previously described the cut-off frequency fc2 of the second low pass filter 34 of the real channel can be variably changed. The smaller the cut-off frequency fc2 is chosen the bigger the difference between the ideal and the real signal will be. This means that also the amplitude and shape of the difference signal is increased and thereby a higher difference signal and in consequence a higher detail signal is added to the video signal so that the image is sharper. Therefore it is clear that by changing the parameter fc2 the sharpness of the image can be changed.

This difference signal is then submitted to the normalisation means 37. Hereby the difference signal is normalised by dividing the difference signal by the edge height, specifically by the value of the gradient at the centre of the edge of the ideal signal. As previously explained the edge height is accounted for by the gain factor control means and therefore the height independent detail signals itself are independent of the edge height and therefore the normalisation means 37 is provided.

Further an interpolation means 38 is provided for accomplishing the sub pixel interpolation. Hereby values between the different pixel positions are determined. These values are necessary since the detail signal has to be positioned with a very high accuracy, e.g. with an accuracy of 1/16 of a pixel. The sub pixel interpolation advantageously is carried out by using a so called polyphase interpolation. The motivation for an interpolation is shown in FIG. 9. In the image signal several pixel positions 70 are determined and the values between the pixels are interpolated. Further, the centre 72 of the edge has to be determined. Since the centre of the edge does not correspond to a pixel position 70, the interpolation is necessary. The zero crossing of the detail signal has to correspond to the centre 72 of the edge. By using the sub pixel interpolation the values of the detail signal at the pixel positions 71 are calculated as shown in FIG. 9.

Referring again now to FIG. 6, after the sub pixel interpolation the height independent detail signal 39 is output.

With reference to FIG. 7 in the following the motion and edge adaptive enhancement means 35 will be explained in detail. This block is realised by the components as shown in FIG. 7. In the following the apparatus is explained with reference to both directions, i.e. with reference to the x-direction as well as to the y-direction, but it is noted that since for each direction a separate detail signal is generated, the apparatus is applied to only one direction at once.

The motion vectors 44, i.e. the vectors for both directions mvX and mvY, as well as the gradient 45 are fed to an inner product means 40. Since only parts of the edge which have components orthogonal to the motion direction are important, i.e. have problems with motion blur, these parts of the edge have to be determined by calculating a scalar product, i.e. an inner product between the motion vector components and the gradient. The inner product is maximal in case that the gradient vector and the motion vector are parallel to each other, i.e. in case the edge is orthogonal to the motion direction. In contrast hereto the inner product will be zero, in case that a motion along the edge is present. In this case no sharpness problems will arise and therefore nothing has to be accomplished. In the first case a complete enhancement has to be processed.

The result of the inner product is fed to a normalisation unit 41 where the inner product is normalised, i.e. divided by the value of the gradient and the motion vectors. After normalisation the result lies in a range of one to zero. With the normalisation step, i.e. by only calculating height independent detail signals, the space needed for the look up table, in case that an offline generation is used, can be kept small.

The inner product and the normalisation can be described as follows:

$$m_1 = \begin{pmatrix} mvX \\ mvY \end{pmatrix} \cdot \begin{pmatrix} g_x \\ -g_y \end{pmatrix} = mvX \cdot g_x - mvY \cdot g_y$$

with: $\vec{v} = \begin{pmatrix} mvX \\ mvY \end{pmatrix}$ motion vector $\vec{g_m} = \begin{pmatrix} g_x \\ -g_y \end{pmatrix}$ modfied gradient $$m_2 = \frac{\left| \begin{pmatrix} mvX \\ mvY \end{pmatrix} \cdot \begin{pmatrix} g_x \\ -g_y \end{pmatrix} \right|}{|\vec{v}| \cdot |\vec{g_m}|} = \frac{|m_1|}{|\vec{v}| \cdot |\vec{g_m}|}$$

In the above equation $m_1$ corresponds to the result of the inner product and $m_2$ is the result after the normalisation. In the above equation the value $g_y$ has a negative value but can also be positive which depends on the definition of the gradient direction and the definition of the motion vectors, i.e. which motion is defined as positive, rightwards, backwards and so on.

Afterwards the signal is multiplied by the absolute value of one of the motion vectors 46 in a multiplier 42. In case that a detail signal is generated for the x-direction, then the signal is multiplied with the absolute value of mvX, otherwise the signal is multiplied with the absolute value of mvY. Thereby, two parameters are generated, which in the following are denoted as Ax and Ay or as a(v), which are used for controlling the enhancement network:

$$A_x = m_2 \cdot |mvX|$$

$$A_y = m_2 \cdot |mvY|$$

In the following the enhancement network 43 will be explained in detail with reference to FIG. 8. Generally, the enhancement network 43 can be any type of high pass or band pass filter whereby the filter coefficients are chosen dependent on $A_x$ or $A_y$. Thereby it is also possible to take the filter coefficients from a further look up table.

The parameters $A_x$ and $A_y$ are used to control the filter structure shown in FIG. 8. The enhancement network in the present embodiment is implemented as a lifting network which lifts the high frequency parts of the ideal signal. That means that the edge hereby is sharpened and peakings are also increased. The input signal a(v) from the multiplication means 42 is fed to the enhancement network 43 and to several multiplication means 53, 54, 55 where the signal is multiplied with the motion adaptive coefficient a (v), which corresponds to $A_x$ or $A_y$ which depends on the direction for which the detail signal is generated. The signals are further delayed by two pixels by the delaying means 51, 52. The signals are then summed up by summing means 56 and the signal 48 is then output. Hereby, the input signal 47 of the enhancement network corresponds to the signal shown in diagram B of FIG. 5 and the output signal 48 of the enhancement network corresponds to the signal shown in diagram C of FIG. 5. That means that the enhancing network 43 enhances frequency components of the modelled ideal signal 47 controlled by the signal submitted by the multiplier.

FIG. 10 shows a second embodiment for a generating apparatus 28 for generating the height independent detail signal. This second generating apparatus 28 also comprises first modelling means 33, 58 for modelling the ideal channel and second modelling means 34, 59 for modelling the real channel.

In this embodiment the lifting network, i.e. the enhancement means 58 is not motion adaptive, but constant. The motion blur, i.e. the damping due to the display aperture and the human visual system are modelled by a further motion and edge adaptive low pass filter 59 provided within the real channel after the second low pass filter 34. The motion estimation 44 and the edge characteristics 45 are fed to the motion and edge adaptive low pass filter 59. With motion and edge adaptive low pass filter 59 also further display parameters such as overdrive values or reaction times of the display can be regarded. The advantage of such an apparatus 28 is that by modelling the real channel by using a motion and edge adaptive low pass filter 59 the modelling is simpler and more accurate.

In a very simple embodiment the human visual system and the display can be modelled by a mean value filter:

$$f(x) = \text{rect}_{\Delta l}(x),$$

whereby rect is the rectangular function and $\Delta l$ the width of the rectangle. The length of the mean value filter is motion adaptive and can be determined by using the following equation:

$$\Delta l_x = m_2 \cdot |mvX| \cdot \alpha$$

$$\Delta l_y = m_2 \cdot |mvY| \cdot \alpha$$

Whereby $\alpha$ is a factor for correcting the length. The factor $\alpha$ can be used for correcting the overall image sharpness. The smaller $\alpha$ is chosen the shorter the filter will be and the smaller the detail signal will also be. That means the sharper the image is supposed to be the higher the value for $\alpha$ has to be chosen.

FIG. 11 shows a third embodiment for a generating apparatus 29 for generating a height independent detail signal. This embodiment is a combination of the first and the second embodiment comprising the already described components in a combination.

With regard to the second generating apparatus 28 and the third generating apparatus 29 it is again to be noted that in case of an online generation, the generating apparatuses 28, 29 are implemented in the height independent detail signal generation means 6, 26 thereby being identical to or a part of the height independent detail signal generation means 6, 26.

To summarize, according to the first aspect of the present invention a detail signal is generated, whereby the motion adaptive part is generated in the height independent detail signal generation means 6, 16, 26. The gain factor is not influenced by the motion estimation. This has the advantage that for every motion the detail signal which is generated can have different shapes and different heights. This improves the appearance of the image when displayed on the display.

In the following, a second aspect according to the present invention will be explained.

According to the second aspect the height independent detail signal is generated according to the prior art without any influence of the motion estimation. The motion estimation is used for generating a motion adaptive gain factor. The corresponding apparatus will be explained in detail in the following with reference to FIG. 16.

FIG. 16 shows a second apparatus 70 for reducing motion blur in a video signal. Components which are identical to those components used in the first aspect of the present invention have the same reference signs and will not be further discussed in the following. The input video signal 2 is fed to an edge detection means 14 and a motion estimation means 24. The edge detection, i.e. the detection of edge characteristics and the motion estimation is accomplished according to the same procedures as described with reference to the first aspect.

The apparatus 70 further comprises a motion adaptive gain factor control means 75 and a height independent detail signal generation means 76 which according to the second aspect generates a detail signal which is motion independent and height independent, i.e. normalised with respect to the edge height.

Therefore, the motion estimation means 24 submits the motion vector 17 to the motion adaptive gain factor control means 75. Likewise, the edge detection means 14 submits the gradient 71 as well as a flag indicating an edge and the edge position 72 to the height independent detail signal generation means 76. As in first aspect additional parameters 8 for example for enhancing the sharpness can be provided.

The motion adaptive gain factor control means 75 then calculates and outputs a motion adaptive gain factor 85 to the multiplication means 9 to which also the height independent detail signal from the height independent detail signal generation means 76 is output. The multiplication means 9 then multiplies the height independent detail signal with the motion adaptive gain factor 85 and submits the thereby generated final synthetic detail signal to the adding means 10, which adds the detail signal to the input video signal 2 and thereby generates the output signal 12. The term "synthetic" hereby is used as in relation to the first aspect and reflects as artificially generated signal, which was not obtained from the input video signal itself e.g. by filtering or the like.

As described with respect to the first aspect, a pre-processing means as well as a post-processing means can also be provided.

The height independent detail signal generation means 76 like in the first aspect can generate the height independent detail signal either online or the detail signal can be generated offline and stored in a look up table contained within the height independent detail signal generation means 76.

In the following, the motion adaptive gain factor control means 75 will be explained in detail with reference to FIG. 17. Hereby, in the following the generation of the motion adaptive gain factor will be explained with reference to the x-direction. But it has to be understood that the generation of the gain factor for the y-direction is accomplished in the same way.

The gradient of the x-direction 71 is fed to a Coring means 73. The gradient is subjected to the already described Coring characteristic curve, which is also shown in FIG. 17. Thereby small values are set to zero so that disturbances like noise due to wrongly detected edges, i.e. gradients, are reduced. Advantageously a so called "soft-Coring" is used. In the present invention the Coring is accomplished separately for the x and the y component of the gradient, but it is possible to also accomplish the Coring at the same time for both gradients which can be dependent on the value of the gradient.

Afterwards the signal is fed into two different lines and the motion adaptive gain factor is determined by adding the signals of two different lines. Hereby, a first line which is shown as upper line in FIG. 17 determines a motion independent part of the gain factor. In a second line, shown as lower line in FIG. 17, the motion dependent part of the gain factor is created.

The first line serves for enhancing the sharpness and comprises a weighting means 77. This part of the gain factor is only dependent on the gradient value. With the weighting means 77 the gain factor can be further influenced, e.g. by multiplication with a fixed factor. The output of the first line is then submitted to an adding means 84.

Now, the second motion adaptive line will be described. The motion vectors 17 as well as the signal received after the Coring is fed to an inner product means 74 where the inner product between the gradient and both motion vectors 17 is calculated. With this operation the part of the edge in each motion direction, i.e. in the x- and in the y-direction is determined.

Afterwards in a normalization means 78 the inner product is normalized. The inner product means 74 and the normalization means 78 hereby in their functionalities correspond to the inner product means 40 and the normalization means 41 described with reference to FIG. 7. The equations and the corresponding calculations are therefore herewith also included in the second aspect.

The signal from the normalization means 78 is then submitted to a multiplication means 79, where the signal is multiplied with the absolute value of a component of the motion vector |mvX| and with the respective arithmetic sign of the gradient, sign (gradX). That means that the signal from the normalization means 78 is multiplied with $$\text{sign}(\text{grad}X) \cdot |\text{mvX}|,$$

which is fed as signal 80 to the multiplication means 79. The component of the motion vector depends on the direction for which the gain factor is determined. The arithmetic sign is necessary since the gain factor can also be negative depending on the direction of the edge, for example depending on whether the edge is a transition from black to white or white to black. It is also possible to use for both edge directions the same detail signal in case that the arithmetic sign of the gain factor is chosen dependent on the edge direction.

Afterwards the signal is fed to a weighting means 81 where the motion adaptive part of the gain factor can be weighted once more. With this weighting the motion adaptive sharpness enhancement can be influenced and thereby the performance of the method can be influenced.

Finally both signals, i.e. the first signal of the none motion adaptive line and the signal of the motion adaptive line are submitted to an adding means 84, where the static and the motion adaptive part of the gain factor are added and summed up for receiving the final motion adaptive gain factor 85.

The advantage of the second aspect is that the implementation is quite simple and therefore also needs small processing resources. Specifically, the generation of the height independent detail signals is independent of the motion. This has two consequences. First, in case that the signals are generated online, a detail signal has not be generated for every pixel anymore but only a single normalized, i.e. height independent detail signal for every grade sharpness has to be calculated. Hereby the sharpness can be influenced with the parameter fc2. This results in a reduce need of calculation capacities. The second consequence is that in case of a look up table, in the look up table no motion adaptive detail signals have to be stored but only detail signals for different grade of sharpness, i.e. the only free parameter is fc2. This results in a reduced size of the look up table.

The main process steps of the method for reducing motion blur according to the second aspect in the following will be explained with reference to FIG. 18. The process starts in step S20 and in the next step S21 the input video signal 2 is received by the apparatus 1 for reducing motion blur according to the present invention. The input video signal 2 is then in step S22 submitted to the analysing means 14, 24 and at the same time the input video signal 2 in step S23 is submitted to the adding means 10. In case that a pre-processing means 3 is provided, then the input video signal 2 instead of being directly submitted to the analysing means 14, 24 first passes the pre-processing means 3 and is then submitted to the analysing means 14, 24.

The analysing means 14, 24 analyses the input video signal 2 for determining edge characteristics within the input video signal 2 and for providing motion estimation of an edge within said input video signal 2. Specifically, the analysing means 14, 24 determines the edge characteristics by determining the position, the height and the orientation of an edge within the video signal. For providing a motion estimation the analysing means 14, 24 provides motion vectors indicating the direction and velocity of the movement of the edge.

The analysing means 14, 24 then submits the edge characteristics in step S25 to a height independent detail signal generation means 76. In step S26 the height independent detail signal generation means 76 generates a height independent detail signal which is also motion independent. This height independent detail signal is independent of the height of the edge and refers to a normalised edge height. The height independent detail signal generation means 76 in the next step S27 submits the motion independent and height independent detail signal to a multiplication means 9.

The analysing means 14, 24 further submits the edge characteristics and the motion vector components in step S28 to the motion adaptive gain factor control means 75 which in the next step S29 calculates a motion adaptive gain factor reflecting the edge height based on the received information. In the next step S30 motion adaptive gain factor control means 75 submits the motion adaptive gain factor also to the multiplication means 9.

In the next step S31 the multiplication means 9 multiplies the received height independent detail signal with the received motion adaptive gain factor thereby obtaining the detail signal which in the present application is sometimes also referred to as final detail signal or synthetic detail signal. In the next step S32 the multiplication means 9 submits the detail signal to the adding means 10, to which already in step S23 the input video signal 2 has been submitted.

Generally, in the present application the motion adaptive gain factor control means 75, the height independent detail signal generation means 76 and the multiplication means 9 in combination are referred to as generating means for generating the detail signal.

In the next step S33 the adding means then adds the received detail signal to the received input video signal 2 thereby obtaining the output video signal. This output video signal then has properties to appear with less motion blur and higher sharpness when displayed on the display. Afterwards (not shown in FIG. 18) a post-processing step can be provided.

The process ends in step S34.

It is to be noted that all features, components, steps and calculations or the like described with reference to the first aspect can also be implemented in the second aspect where appropriate. Likewise, all features, components, steps and calculations or the like described with reference to the second aspect can also be implemented in the first aspect where appropriate.

Further, in the first aspect as well as in the aspect edge characteristics or motion estimation is transmitted from the analysing means 4, 14, 24, to several other components. In this case the edge characteristics do not necessarily comprise all information of the edge, e.g. it is possible to only transmit the edge position or to only transmit the edge height. Nevertheless, this transmitted information will be referred to as "edge characteristics".

A further possibility of generating the detail signal in a very simple form is described in the following. Starting point for the generation is an arbitrary point symmetric and finite function for example sinusoidal function. Such a function is shown in FIG. 12. Hereby, the detail signal is represented by a function which in the simplest form is a sinusoid $f(x)=\sin(x)$. But the present invention is not limited to a sinusoid and can be adapted to any other function, the only condition for the function is that the function has to be symmetric with respect to the zero crossing in the middle and finite. The length of the sinusoid is determined by the length of the detail signal, i.e. the number of pixels, which in the present example is a length of five pixels.

Depending on the motion velocity and the edge characteristics the height H of the detail signal is changed adaptively. The larger the velocity or the part of the edge orthogonal to the motion direction is, the higher the amplitude of the signal has to be chosen. In an example the height of the detail signal for x- and y-direction can be determined by the following equation:

$$H_x = |mvX| \cdot m_2 \cdot \beta$$

$$H_y = |mvY| \cdot m_2 \cdot \beta$$

$\beta$ hereby is an arbitrary fixed factor which can be adapted via the image sharpness. Otherwise, more general function of for example the form $$H = f(|\vec{v}|, |\vec{g}|, mvX, mvY)$$

are possible. This form of detail signal generation is specifically advantageous for the online generation since it is very simple and only requires small processing resources.

A possible implementation of the apparatus and method of the present invention is a combination of several image based methods by using an image analysis or a segmentation. Such an implementation in a system for improving the overall video signal quality is shown in FIG. 13. The input signal 61 is fed into the system 60. By a segmentation means 64 the video signal is analysed and segmented into edges, homogeneous parts (such as flat areas) and textures or details. This information is submitted to further components, specifically the information of the edges is submitted to an edge correction apparatus 62 which can be implemented by an apparatus for reducing motion blur according to the present invention. In parts of an image having a texture or detail, the already known MCIF method can be used since in these parts an increasing of the noise is acceptable. Therefore a modified MCIF means 63 can also be implemented. In parts of the image with homogeneous parts no corrections are accomplished. The different signals relating to the edge, the detail or flat parts are then submitted to a combination means 65 which combines the respective corrected signal and submits and output signal 66 to the display.

The present invention can be used for reducing motion blur in a video signal when displayed, i.e. for correcting the blurring arising due to the technical properties of the display. Additionally, the present invention can also be used to reduce motion blur on the side of the camera which arises during the recording. I.e. the apparatuses and methods described in the different aspects and embodiment can also be implemented in a camera for reducing blurring during the recording.

Generally, there exist several reasons for blurring during recording. Within the camera during recording there are two types of blurring, i.e. out of focus blur and linear motion blur. Out of focus blur arises due to a false focussing which in consequence results in reduced details in the recorded object. The higher the out-of focussing is the higher the blurring in the recorded object will be. The linear motion blur arises in case that the object is moving during the shutter time of the camera. Thereby a slurring in the movement direction is created which results in a blurring of the recorded object. The blurring during the recording therefore bases on the same circumstances as the hold-type motion blur on the display side. Therefore two components are part of this blurring, namely the temporal integration for example due to the sensor within the camera or the human visual system and the movement of the object during the integration relative to the sensor, for example fast moving objects within a scene.

For reducing blur in the recording generally two methods can be used, which can be divided into two categories: On one hand methods using an inverse filtering can be used which base on the knowledge of the reasons and the magnitude of the blurring (deconvolution methods) and on the other hand methods which additionally to the inverse filtering use parameters of a blurring or recording model since the reasons and magnitude of the blurring is not known (blind deconvolution method).

Examples for methods of the first category are for example non iterative methods such as simple inverse filtering or the Wiener filter or iterative methods using the Van Cittert Algorithm, the Landweber-Algorithm or the Richardson-Lucy-Algorithm. Methods of the second category are for example methods according to Ayers and Dainty or the modification according to Kundur.

Since the parameters of the motion blur are not known and since also the out of focus blur can not be determined from the beginning, in the video signal recording situation a method of the second category has to be used.

The present invention proposes such a method for reducing motion blur during the recording within a camera. The advantage of this method is its robustness with regard to noise since a synthetically generated signal is added which is calculated based on image parameter analysis, specifically based on edge characteristics and motion estimation. In contrast to the state of art methods, which use the video signal itself for filtering or enhancing, thereby enhancing also the noise, the present invention relates to the generation of a synthetic detail signal.

The present invention, specifically the apparatus according to the first aspect or the apparatus according to the second aspect can be implemented within a camera. in a simple implementation also a rectangular function can be used but for the camera the apparatus and method can also be adapted to further reduce the motion blur. Specifically, in case that additionally an out of focus blur arises, this out of focus blur can additionally be corrected by changing respective parameters for influencing the global static sharpness enhancement. In this case an additional unit would have to be provided for determining the out of focus blur.

With the present invention different implementations of an apparatus and corresponding different methods are described for reducing motion blur in an image when displayed on the display as well as in an image when recorded by a camera.

The invention claimed is:

1. An apparatus for reducing motion blur in a video signal, comprising:
    an analysing means for determining edge characteristics of an input video signal and for providing a motion estimation of an edge within said input video signal;
    a generation means for generating a synthetic detail signal dependent on said edge characteristics and said motion estimation, said synthetic detail signal being artificially generated and being only dependent on said edge characteristics and said motion estimation; and an adding means for adding the synthetic detail signal to the edge within the input video signal and for outputting an output video signal, wherein the generation means further includes:

a gain factor control means for calculating a gain factor ($a_g$) that represents a height of the edge, a height independent detail signal generation means for generating a height independent detail signal based on a position and an orientation of the edge, and the motion estimation, and a multiplication means for multiplying the height independent detail signal with the gain factor (ag) to obtain the synthetic detail signal, and for submitting the synthetic detail signal to the adding means.

2. The apparatus according to claim 1, wherein the analysing means for determining the edge characteristics determines a position, a height, and an orientation of the edge within the input video signal.

3. The apparatus according to claim 1, wherein the analysing means provides motion vectors that indicate a direction and a velocity of a movement of the edge.

4. The apparatus according to claim 1, wherein the height independent detail signal generation means includes a look up table that contains a plurality of readily calculated height independent detail signals for different combinations of motion vector information, a direction, and a position of the edge, and the height independent detail signal generation means selects the height independent detail signal from said look up table.

5. The apparatus according to claim 1, wherein the height independent detail signal generation means calculates the height independent detail signal based on information submitted by the analysing means.

6. The apparatus according to claim 1, wherein the generation means generates the detail signal by adapting a length and an amplitude of an arbitrary point symmetric and finite function.

7. The apparatus according to claim 6, wherein the arbitrary point symmetric and finite function is a sinusoidal function.

8. The apparatus according to claim 1, wherein the generation means includes:

a motion adaptive gain factor control means for calculating a motion adaptive gain factor that represents a height of the edge based on the motion estimation.

9. The apparatus according to claim 1, wherein the generations means includes:

a height independent detail signal generation means for generating a motion independent and height independent detail signal based on a position and an orientation of the edge.

10. The apparatus according to claim 8, wherein the generation means further includes:

a height independent detail signal generation means for generating a motion independent and height independent detail signal based on the position and orientation of the edge; and a multiplication means for multiplying a motion independent and height independent detail signal with the motion adaptive gain factor thereby obtaining the synthetic detail signal, and for submitting the synthetic detail signal to the adding means.

11. An apparatus for reducing motion blur in a video signal, comprising:

an analysing means for determining edge characteristics of an input video signal and for providing a motion estimation of an edge within said input video signal;

a generation means for generating a synthetic detail signal dependent on said edge characteristics and said motion estimation, said synthetic detail signal being artificially generated and being only dependent on said edge characteristics and said motion estimation; and an adding means for adding the synthetic detail signal to the edge within the input video signal and for outputting an output video signal, wherein the generation means further includes:

a gain factor control means for calculating a gain factor ($a_g$) that represents a height of the edge, a height independent detail signal generation means for generating a height independent detail signal based on a position and an orientation of the edge, and the motion estimation, the height independent detail signal generation means calculates the height independent detail signal based on information submitted by the analysing means, and the height independent detail signal generation means includes a first modelling means for modelling a transmission characteristics of an ideal transmission channel for providing a modelled ideal signal.

12. The apparatus according to claim 11, wherein the first modelling means includes a first low pass filter and a motion and an edge adaptive enhancement means.

13. The apparatus according to claim 12, wherein the motion and the edge adaptive enhancement means includes:

an inner product means for calculating an inner product between motion vector components and a gradient, a normalisation unit for normalising the inner product, a multiplier for multiplying the normalised inner product with an absolute value of one of the motion vector components, and an enhancement network for enhancing frequency components of the modelled ideal signal controlled by a signal submitted by the multiplier.

14. The apparatus according to claim 11, wherein the first modelling means includes a first low pass filter and a static enhancement means.

15. The apparatus according to claim 11, wherein the height independent detail signal generation means further includes:

a second modelling means for modelling transmission characteristics of a real transmission channel for providing a modelled real signal; and a subtraction means for subtracting the modelled real signal from the modelled ideal signal thereby obtaining a difference signal.

16. The apparatus according to claim 15, wherein the height independent detail signal generation means further includes:

a normalisation means for normalising the difference signal with respect to the height of the edge.

17. An apparatus for reducing motion blur in a video signal, comprising:

an analysing means for determining edge characteristics of an input video signal and for providing a motion estimation of an edge within said input video signal;

a generation means for generating a synthetic detail signal dependent on said edge characteristics and said motion estimation, said synthetic detail signal being artificially generated and being only dependent on said edge characteristics and said motion estimation; and an adding means for adding the synthetic detail signal to the edge within the input video signal and for outputting an output video signal, wherein the generation means further includes:

a gain factor control means for calculating a gain factor ($a_g$) that represents a height of the edge, a height independent detail signal generation means for generating a height independent detail signal based on a position and an orientation of the edge, and the motion estimation, the height independent detail signal generation means calculates the height independent detail signal based on information submitted by the analysing means, and the height independent detail signal generation means includes second modelling means for modelling transmission characteristics of a real transmission channel for providing a modelled real signal.

18. The apparatus according to claim 17, wherein the second modelling means includes a second low pass filter.

19. The apparatus according to claim 17, wherein the second modelling means includes a second low pass filter, and a motion and an edge adaptive low pass filter.

20. A system for providing an overall improvement of video signal quality, comprising:

a segmentation means for segmenting a video signal into edges, homogeneous parts, and textures;

an apparatus for reducing motion blur with respect to said edges including:

an analysing means for determining edge characteristics of said video signal and for providing a motion estimation of said edge within said input video signal, a generation means for generating a synthetic detail signal dependent on said edge characteristics and said motion estimation, said synthetic detail signal being artificially generated and being only dependent on said edge characteristics and said motion estimation, and an adding means for adding the synthetic detail signal to said edge within said video signal and for outputting an output video signal;

a modified MCIF means for reducing motion blur with respect to said textures; and a combination means for combining motion blur reduced signals to said output video signal, wherein the generation means further includes:

a gain factor control means for calculating a gain factor ($a_g$) that represents a height of the edge, a height independent detail signal generation means for generating a height independent detail signal based on a position and an orientation of the edge, and the motion estimation, and a multiplication means for multiplying the height independent detail signal with the gain factor (ag) to obtain the synthetic detail signal, and for submitting the synthetic detail signal to the adding means.

21. A method for reducing motion blur in a video signal, the method comprising steps of:

determining edge characteristics of an input video signal;

providing a motion estimation of an edge within said input video signal;

generating a synthetic detail signal dependent on said edge characteristics and said motion estimation, said synthetic detail signal being artificially generated and being only dependent on said edge characteristics and said motion estimation; and adding the synthetic detail signal to the edge within the input video signal and outputting an output video signal, wherein the step of generating further includes the steps of:

calculating a gain factor ($a_g$) that represents a height of the edge, generating a height independent detail signal based on a position and an orientation of the edge, and the motion estimation, and multiplying the height independent detail signal with the gain factor (ag) to obtain the synthetic detail signal.

* * * * *